United States Patent [19]

Okita et al.

[11] Patent Number: 4,560,616

[45] Date of Patent: Dec. 24, 1985

[54] MAGNETIC RECORDING MEDIUM HAVING BINDER CURED BY ELECTRON BEAM RADIATION

[75] Inventors: Tsutomu Okita, Kanagawa; Kyoichi Naruo, Shizuoka; Hiroshi Hashimoto, Kanagawa, all of Japan

[73] Assignee: Fuji Photo Film Co., Ltd., Kanagawa, Japan

[21] Appl. No.: 521,797

[22] Filed: Aug. 9, 1983

[30] Foreign Application Priority Data

Aug. 10, 1982 [JP] Japan ................... 57-138981

[51] Int. Cl.$^4$ ............................................... G11B 5/70
[52] U.S. Cl. .......................... 428/423.1; 252/62.5 Y; 360/134; 360/135; 360/136; 427/44; 427/128; 428/522; 428/694; 428/900
[58] Field of Search .................... 428/695, 694, 423.1, 428/900, 522; 427/44, 131, 130, 128; 252/62.5 Y; 360/134–136

[56] References Cited

U.S. PATENT DOCUMENTS

| | | | |
|---|---|---|---|
| 3,634,137 | 1/1972 | Akashi | 428/505 |
| 3,871,908 | 3/1975 | Spoor | 428/461 |
| 4,004,997 | 1/1977 | Tsukamoto | 428/458 |
| 4,049,871 | 9/1977 | Ogawa | 428/425.9 |
| 4,154,895 | 5/1979 | Ogawa | 428/425.9 |
| 4,238,548 | 12/1980 | Okuyama | 428/480 |
| 4,307,154 | 12/1981 | Hosaka | 428/413 |
| 4,333,988 | 6/1982 | Yamada | 428/425.9 |
| 4,343,831 | 8/1982 | Tsuji | 427/128 |
| 4,368,239 | 1/1983 | Nakajima | 428/520 |
| 4,400,435 | 8/1983 | Yoda | 427/128 |
| 4,407,853 | 10/1983 | Okita | 427/44 |
| 4,415,630 | 11/1983 | Kubota | 428/694 |
| 4,428,974 | 1/1984 | Okita | 427/44 |
| 4,431,712 | 2/1984 | Matsufuji | 428/900 |
| 4,434,210 | 2/1984 | Nakajima | 428/405 |
| 4,443,490 | 4/1984 | Nakajima | 428/900 |
| 4,448,848 | 5/1984 | Okita | 427/130 |

FOREIGN PATENT DOCUMENTS 57-128711 8/1982 Japan .

*Primary Examiner*—Ellis P. Robinson
*Attorney, Agent, or Firm*—Sughrue, Mion, Zinn, Macpeak & Seas

[57] ABSTRACT

A magnetic recording medium comprising a support having coated thereon a magnetic layer is disclosed. The magnetic layer is comprised of a binder composition having ferromagnetic particles dispersed therein. The binder composition is cured by an electron beam and comprises a copolymer, a urethane resin and a compound having two or more acryloyl groups or methacryloyl groups. The copolymer may be a vinyl chloride-vinyl acetate-vinyl alcohol copolymer having a vinyl alcohol content of 1 to 15 wt % or a vinyl chloride-vinyl acetate-maleic acid copolymer having a maleic acid content of 1 to 10 wt %. The recording medium has excellent electromagnetic properties and the magnetic layer has excellent dynamic properties.

14 Claims, No Drawings

MAGNETIC RECORDING MEDIUM HAVING BINDER CURED BY ELECTRON BEAM RADIATION

FIELD OF THE INVENTION

The present invention relates to magnetic recording media such as video tapes, audio tapes or computer tapes. More specifically, it relates to a magnetic recording medium having a magnetic layer cured by an electron beam.

BACKGROUND OF THE INVENTION

Binders which have been commonly used for magnetic recording media include thermoplastic resins such as vinyl chloride-vinyl acetate resins, vinyl chloride-vinylidene chloride resins, cellulose resins, acetal resins, urethane resins and acrylonitrile-butadiene resins used alone or in combination. However, with such binders the magnetic layer generally has poor wear resistance and the tape guiding systems which contact with magnetic tapes are stained during tape running.

Various improvements have been proposed where a thermosetting resin such as melamine resins or urea resins is used as a binder, or a binder which can be cross-linked by a chemical reaction such as an isocyanate compound or an epoxy compound is added to the above-described theremoplastic resins. However, disadvantages occur when using such a cross-linking type binder. Firstly, the storage stability of the resin solution in which ferromagnetic particles are dispersed is low, i.e., the pot life is short and the physical properties of the resulting magnetic coating composition cannot be kept homogeneous, and accordingly, magnetic tapes cannot be uniformly prepared. Secondly, after coating and drying the magnetic coating composition, heat treatment is necessary to cure a coating layer thereby requiring a long period of time to manufacture magnetic recording media.

In order to eliminate the above disadvantages, a method has been proposed where a magnetic recording medium is prepared by using a combination of an acrylate oligomer and an acrylate type monomer as a binder and curing the binder by electron beam radiation after drying, as disclosed in Japanese Patent Publication No. 12423/72, Japanese Patent Application (OPI) Nos. 77433/75 and 25231/81 (the term "OPI" as used herein refers to a "published unexamined Japanese patent application"), U.S. Pat. Nos. 3,871,908 and 4,368,239, German Pat. No. 2,100,037 and Dutch Pat. No. 7,118,222. However, a magnetic recording medium having satisfactory physical properties and electric properties cannot be obtained in accordance with the above-described conventional methods.

Recently, it has become necessary that a support for magnetic tapes be made thinner for long-time recording and that the physical strength of the magnetic layer be improved. Further, as video cassette recorders have become to have multi-functions, video tapes used therefor are required to withstand use under severe conditions. However, it has hitherto been impossible to produce a magnetic recording medium having physical strength which satisfies the above requirements.

The inventors have attained the present invention as a result of extensive studies for improvements of conventional methods such as a method of using thermoplastic resins and thermosetting resins as disclosed in U.S. Pat. Nos. 3,634,137, 4,238,548 and 4,307,154, a method of adding a binder cross-linkable by a chemical reaction as disclosed in U.S. Pat. Nos. 4,333,988, 4,154,895 and 4,049,871, or a method of using a curable binder cured by electron beams, as disclosed in U.S. Pat. Nos. 3,871,908, 4,004,997 and 4,343,831 (Tsuji et al).

SUMMARY OF THE INVENTION

A primary object of the present invention is to provide a magnetic recording medium having an excellent electromagnetic properties.

Another object of the present invention is to provide a magnetic recording medium having a magnetic layer excellent in dynamic properties.

A further object of the present invention is to provide a magnetic recording medium having a magnetic coating composition excellent in storage stability and homogeneous physical properties.

A still further object of the present invention is to provide a magnetic recording medium having excellent wear resistance. A yet further object of the present invention is to provide a magnetic recording medium prepared without heat treatment which is normally necessary for curing a magnetic coating layer.

The above objects can be accomplished with a magnetic recording medium comprised of a binder composition containing (1) at least one of vinyl chloride-vinyl acetate-vinyl alcohol copolymer (content of vinyl alcohol: 1 to 20 wt %) and vinyl chloride-vinyl acetate-maleic acid copolymer (content of maleic acid: 1 to 10 wt %), (2) a urethane resin, and (3) a compound having two or more acryloyl groups or methacryloyl groups, the amount of each of the copolymer and the urethane resin being 20 to 80 parts by weight and the amount of said compound (3) being 50 to 400 parts by weight based on 100 parts by weight of the mixture of the copolymer and the urethane resin, and said binder composition being cured by electron beam radiation.

DETAILED DESCRIPTION OF THE INVENTION

The binder composition of the present invention is comprised of a vinyl chloride-vinyl acetate type copolymer, a urethane resin and a compound having two or more of acryloyl groups or methacryloyl groups in one molecule. The binder composition is irradiated with an electron beam whereby these resins function synergistically to provide a magentic recording medium excellent in electromagnetic properties, running properties and durability.

The vinyl alcohol content gf vinyl chloride-vinyl acetate-vinyl alcohol copolymer is preferably 1 to 20 wt % and more preferably 5 to 15 wt %.

The content of maleic acid of vinyl chloride-vinyl acetate-maleic acid copolymer is preferably 1 to 10 wt % and more preferably 2 to 8 wt %.

Outside the above ranges, electromagnetic properties are markedly decreased.

The vinyl chloride-vinyl acetate type copolymers used in the present invention preferably have a breaking strength more than about 5 kg/mm$^2$ and an average molecular weight more than about 15,000.

Urethane resins include both polyether type and polyester type resins. The preferred range of the molecular weight is 5,000 to 100,000, more preferably 10,000 to 50,000. Outside the above range, dispersion of ferromagnetic particles is degraded.

Examples of urethane resins which can be used in the present invention include polyester polyurethane resins obtained from a diisocyanate compound and a polyester polyol (prepared by reacting a dibasic acid such as phthalic acid, adipic acid, dimerized linoleic acid, maleic acid or the like with a polyhydric alcohol such as a glycol, for example, ethylene glycol, propylene glycol, butyrene glycol or diethylene glycol, trimethylolpropane, hexanetriol, glycerin, trimethylolethane, pentaerythritol or the like), and polyether polyurethanes obtained from a diisocyanate compound and a polyether polyol (prepared by reacting propylene oxide, ethylene oxide or the like with a polyhydric alcohol as described above). Examples of diisocyanate compounds useful for urethane formation are tolylene diisocyanate, 4,4'-diphenylenemethane diisocyanate, hexamethylene diisocyanate, metaxylylene diisocyanate, cyanate, cyclohexyl diisocyanate and the like.

Examples of compound having two or more acryloyl groups or methacryloyl groups in the molecule include acrylates such as diethylene glycol diacrylate, triethylene glycol diacrylate, tetraethylene glycol diacrylate, trimethylolpropane triacrylate or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; esters of polyols and acrylic acids or methacrylic acids; and compounds having two or more acryloyl groups or methacryloyl groups at the terminal groups of the main polymer chain or in the side chains thereof.

The compounds having acryloyl group or methacryloyl group at the terminal groups of the main chain or in the side chains thereof are referred to in A. Vrancken, *Fatipec Congress*, 11, 19 (1972). For example, these compounds can be shown by the following structure.

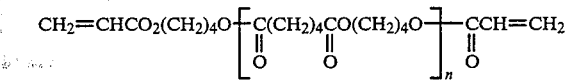

wherein n is an integer. The polyester skeleton of the above compounds can be a polyurethane skeleton, an epoxy resin skeleton, a polyether skeleton or a polycarbonate skeleton or a mixture thereof. The molecular weight is preferably in the range of from 1,000 to 20,000, but is not particularly limited.

Preferred examples of the compounds having two or more acryloyl groups or methacryloyl groups are diethylene glycol diacrylate, triethylene glycol diacrylate, tetraethylene glycol diacrylate, trimethylolpropane triacrylate, pentaerythritol tetraacrylate and the acrylate compound represented by the above formula.

The above-described compounds may be used alone or as a mixture thereof. Further, a compound having one carbon-carbon unsaturated bond in its molecule which can be polymerized by electron beams can also be added to the composition of the present invention.

Examples of compounds having one carbon-carbon unsaturated bond are acrylic acid, itaconic acid, methyl acrylate and homologues thereof such as alkyl acrylates, styrene and homologues thereof such as α-methylstyrene, β-chlorostyrene, etc., acrylonitrile, acrylamide, vinyl acetate, vinyl propionate, N-vinylpyrrolidone and the like. Other examples include compounds disclosed in "Kankosei Jushi Data-shu (A List of Data on Photosensitive Resins)", published by Sogo Kagaku Kenkyusho, December 1968, pp. 235–236.

The mixing ratio of vinyl chloride-vinyl acetate type copolymer and urethane resin is preferably 20 to 90/80 to 10 by weight, more preferably 40 to 80/60 to 20 by weight. Sufficient durability of the magnetic recording medium cannot be obtained if the copolymer or the urethane resin is less than the above ratio. The amount of the compound having two or more of acryloyl groups or methacryloyl groups in one molecule is preferably in the range of from 50 to 400 parts by weight, more preferably in the range of from 80 to 250 parts by weight, per 100 parts by weight of a mixture of the vinyl chloride-vinyl acetate type copolymer and the urethane resin. Use of the compound in an amount more than the upper limit is not preferred since the dose of electron beam required for polymerization becomes high. On the other hand, use of the compound in an amount less than the lower limit does not give rise to sufficient crosslinking which results in poor durability of the magnetic recording medium.

Ferromagnetic powders used in the present invention include ferromagnetic iron oxide fine powders, Co-doped ferromagnetic iron oxide fine powders, ferromagnetic chromium dioxide fine powders, ferromagnetic alloy fine powders and barium ferrite. The acicular ratio of ferromagnetic iron oxide and chromium dioxide is about 2/1 to about 20/1, preferably more than 5/1. An average length of the ferromagnetic alloy powders is about 0.2 to about 2.0 μm. The ferromagnetic alloy fine powders generally have a metal content more than 75 wt %, with more than 80 wt % of the metal content being a ferromagnetic metal (i.e., Fe, Co, Ni, Fe-Co, Fe-Ni, Co-Ni, Fe-Co-Ni), and has a longer diameter of less than about 1.0 μm.

Examples of organic solvents which can be used for the magnetic coating composition include ketones such as acetone, methyl ethyl ketone, methyl isobutyl ketone, cyclohexanone; esters such as methyl acetate, ethyl acetate, butyl acetate, ethyl lactate, and monoethyl ether glycol acetate; glycol ethers such as diethyl ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene. The organic solvent can be used in an amount of about 400 to about 1,500 parts by weight, preferably 600 to 1,200 parts by weight, per 100 parts by weight of the resin composition.

Additives such as a lubricant, an abrasive, a dispersing agent, a rust preventing agent or an antistatic agent can be added to the magnetic coating composition of the present invention. Examples of lubricants are saturated or unsaturated higher fatty acids, fatty acid esters, higher fatty acid amides, higher alcohols, each containing 10 or more carbon atoms, preferably 12 or more carbon atoms, silicone oils, mineral oils, edible oils or fluoride type compounds. Examples of rust preventing agents are salicylanilide, tin oxide, mercury phenyloleate, copper naphthenate, zinc naphthenate, trichlorophenol, p-dinitrophenol, sorbic acid, butyl p-oxybenzoate, dihydroacetoacetic acid and the like. Some of these additives are disclosed in U.S. Pat. No. 4,135,016. These additives can be added when a coating composition is prepared, or can be coated or sprayed on a surface of a magentic layer with or without an organic solvent after drying, smoothing the magnetic layer or curing the magnetic layer by electron beam radiation.

Materials for the support on which the magnetic coating composition is coated include polyesters such as polyethylene terephthalate or polyethylene-2,6-naphthalate; polyolefines such as polyethylene or polypropylene; cellulose derivatives such as cellulose triacetate; plastics such as polycarbonate, polyimide or polyamide imide; non-magnetic metals such as aluminum, copper, tin, zinc or non-magnetic alloys including the above metals; and a kind of paper or a paper coated or laminated with polyolefines. Preferred examples of the supports include polyethylene terephthalate, polyethylene-2,6-naphthalate and polyimide films. The thickness of these supports can be generally in the range of about 5 to about 100 μm, preferably 7 to 20 μm, but can vary widely over the above range depending upon the utility of magnetic recording media.

The non-magnetic support may be in the shape of film, a tape, a sheet, a disc, a card or a drum, and various materials can be selected depending upon the above shapes.

A backcoat can be provided on the support on the side opposite the magnetic layer for the purposes of preventing charging, transferring, wow flutter, improving the strength of the magnetic recording medium and for making the back side of the support a matted layer.

A canning method, a double scanning method, a curtain beam method or a broad beam curtain method can be used for accelerating electron beams.

The electron beam used has an accelerating voltage of 100 to 1,000 kv, preferably 150 to 300 kv. The absorption dose is 0.5 to 20 megarads, preferably 3 to 15 megarads. If the accelerating voltage is less than 100 kv, the transmitted amount of energy is insufficient and if the accelerating voltage is more than 1,000 kv, the energy efficiency used for polymerization is lowered making the process uneconomical. If the absorption dose is less than 0.5 megarad, the curing reaction is insufficient to obtain a magnetic layer having a satisfactory mechanical strength and if the absorption dose is more than 20 megarads, the energy efficiency used for curing reaction is lowered or a radiated object generates heat and the support, particularly a plastic support, may be deformed.

The present invention is further illustrated in greater detail by the following examples and comparative examples, but the present invention is not limited thereto. In examples and comparative examples, all parts and ratios are by weight unless otherwise indicated.

EXAMPLE I

| | |
|---|---|
| γ-Fe$_2$O$_3$ | 400 parts |
| Vinyl chloride-vinyl acetate vinyl alcohol copolymer (Copolymerization ratio: 89:3:8) | 50 parts |
| Urethane resin (Condensation product of adipic acid, butane diol and tolylene diisocyanate) | 15 parts |
| Ester acrylate oligomer ("Aronix M6100" manufactured by Toagosei Chemical Industry Co., Ltd.) | 30 parts |
| Diethylene glycol diacrylate | 5 parts |
| Lecithin | 4 parts |
| Stearic acid | 4 parts |
| Butyl stearate | 4 parts |
| Methyl ethyl ketone | 1000 parts |

The above composition was kneaded in a ball mill for 50 hours to obtain a magnetic coating composition, which was then coated by a doctor blade in a dry thickness of 5 μ on a polyethylene terephthalate support having a thickness of 15 μ. The coated layer was subjected to orientation with a cobalt magnet and the solvent was evaporated at 100° C. for 1 min. The coated layer was subjected to a smoothing treatment with calender rolls composed of five pairs of rolls, with each pair including a cotton roll and a mirror roll (a roll temperature: 60° C., pressure: 100 Kg/cm$^2$) An electron beam with an accelerating voltage of 200 kV and a beam current of 10 mA was radiated so that the absorption dose was 10 Mrad. The resulting magnetic recording medium was identified as Sample No. 1.

COMPARATIVE EXAMPLE 1

The same procedure as described in Example 1 was repeated except that the following binder composition was used instead of the binder used in Example 1 and that the roll temperature of the calender treatment was 30° C. to prepare a magnetic recording medium. The resulting sample was identified as Sample No. 2.

| | |
|---|---|
| Urethane resin | 65 parts |
| Ester acrylate oligomer (Aronix M6100) | 30 parts |
| Diethylene glycol diacrylate | 5 parts |

COMPARATIVE EXAMPLE 2

The same procedure as described in Example 1 was repeated except that the following binder composition was used instead of the binder used in Example 1 and that the roll temperature of the calender treatment was 50° C. to prepare a magnetic recording medium. The resulting sample was identified as Sample No. 3.

| | |
|---|---|
| Vinyl chloride-vinyl acetate-vinyl alcohol copolymer | 65 parts |
| Ester acrylate oligomer (Aronix M6100) | 30 parts |
| Diethylene glycol diacrylate | 5 parts |

COMPARATIVE EXAMPLE 3

The same procedure as described in Example 1 was repeated except that the following binder composition was used instead of the binder used in Example 1 to prepare a magnetic recording medium. The resulting sample was identified as Sample No. 4.

| | |
|---|---|
| Vinyl chloride-vinyl acetate-vinyl alcohol copolymer | 65 parts |
| Urethane resin | 35 parts |

EXAMPLE 2

The same procedure is described in Example 1 was repeated except that the following binder composition was used instead of the binder used in Example 1 to prepare a magnetic recording medium. The resulting sample was identified as Sample No. 5.

| | |
|---|---|
| Vinyl chloride-vinyl acetate-maleic acid copolymer (Vinyl chloride: 92, vinyl acetate: | 50 parts |

-continued

| | |
|---|---|
| 4, maleic acid: 4) | |
| Urethane resin | 15 parts |
| Urethane acrylate oligomer | 30 parts |
| ("Aronix M1100" manufactured by | |
| Toagosei Chemical Industry Co., Ltd.) | |
| Trimethylolpropane triacrylate | 5 parts |

EXAMPLE 3

The same procedure as described in Example 1 was repeated except that the following binder composition was used instead of the binder used in Example 1 to prepare a magnetic recording medium. The resulting sample was identified as Sample No. 6.

| | |
|---|---|
| Vinyl chloride-vinyl acetate-maleic acid copolymer (vinyl chloride: 94, vinyl acetate: 4, maleic acid: 2) | 35 parts |
| Urethane resin | 25 parts |
| Diethylene glycol diacrylate | 40 parts |

Samples of Examples 1 to 3 and Comparative Example 1 to 3 were run on a video tape recorder for 100 passes in order to measure their dynamic friction coefficient, time of durability at still mode and squareness ratios (residual flux density/maximum flux density). The results obtained are shown in Table 1.

TABLE 1

| Sample No. | Squareness Ratio | Dynamic Friction Coefficient after Repeated Use*1 | Time of Durability at Still Mode (min)*2 | Remarks |
|---|---|---|---|---|
| 1 | 0.83 | 0.21 | more than 60 | Invention |
| 2 | 0.65 | The tape run stopped due to adhesion to a magnetic head. | 3 | Comparative |
| 3 | 0.75 | 0.50 | 15 | " |
| 4 | 0.75 | The magnetic layer was stripped out. | 1 | " |
| 5 | 0.83 | 0.19 | more than 60 | Invention |
| 6 | 0.81 | 0.21 | more than 60 | " |

*1: Dynamic friction coefficient was indicated in terms of "$\mu$" value calculated by the following equation, using a VHS type video tape recorder (trade name: "Macroad 88" (NV-8200 type) manufactured by Matsushita Electric Industrial Co., Ltd.) at 40° C. and 65% relative humidity: $T_2/T_1 = e^{\mu \pi}$ where $T_1$ is a tape tension at the supply side of the rotary cylinder of VTR and $T_2$ is a tape tension at the take-up side of the rotary cylinder of VTR, whereby the effect of $T_1$ is removed from $T_2$ when $T_2$ is for larger than $T_1$. Running tension was evaluated in terms of $\mu$. Values indicated in Table 1 were obtained after 100 passes.
*2: The time of durability at still mode was determined by recording predetermined video signals on video tapes (each samples) using a VHS type video tape recorder (trade name: "NV-8200 type" manufactured by Matsushita Electric Industrial Co., Ltd.), and measuring the period of time until the reproduced still images loose their clearness at 5° C. and 65% relative humidity.

As is apparent from the results shown in Table 1, Sample Nos. 1, 5 and 6 show excellent results in squareness, dynamic friction coefficient and still durability. Sample No. 2 prepared by using only a urethane resin shows low squareness ratio and poor running properties and still durability. Sample No. 3 using only a vinyl chloride-vinyl acetate type copolymer and Sample No. 4 containing no compound having (meth)acryloyl groups show poor results in running properties and still life as compared with Samples according to the present invention.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having coated thereon a magnetic layer containing ferromagnetic particles dispersed in a binder, said binder comprising
   a vinyl chloride-vinyl acetate type copolymer selected from the group consisting of vinyl chloride-vinyl acetate-vinyl alcohol copolymers having a vinyl alcohol content of 1 to 15 wt % and vinyl chloride-vinyl acetate-maleic acid copolymers having a maleic acid content of 1 to 10 wt %;
   a urethane resin; and
   a compound having two or more acryloyl groups or methacryloyl group,
   wherein the copolymer and the urethane resin are each present in an amount in the range of 20 to 80 parts by weight and the compound is present in an amount in the range of 50 to 400 parts by weight based on 100 parts by weight of the mixture of the copolymer and the urethane resin,
   further wherein the binder composition is cured by electron beam radiation.

2. A magnetic recording medium as claimed in claim 1, wherein the copolymer is the vinyl chloride-vinyl acetate-vinyl alcohol copolymer having a vinyl alcohol content in the range of 5 to 15 wt %.

3. A magnetic recording medium as claimed in claim 1, wherein the copolymer is the vinyl chloride-vinyl acetate-maleic acid copolymer having a maleic acid content in the range of 2 to 8 wt %.

4. A magnetic recording medium as claimed in claim 1, wherein the urethane resin has a molecular weight in the range of 5,000 to 100,000.

5. A magnetic recording medium as claimed in claim 1, wherein the urethane resin has a molecular weight in the range of 10,000 to 50,000.

6. A magnetic recording medium as claimed in claim 1, wherein the compound has a molecular weight in the range of 1,000 to 20,000.

7. A magnetic recording medium as claimed in claim 1, wherein the mixing weight ratio of the copolymer to the urethane, resin is in the range of 20 to 90:80 to 10.

8. A magnetic recording medium as claimed in claim 1, wherein the mixing weight ratio of the copolymer to the urethane resin is in the range of 40 to 80:60 to 20.

9. A magnetic recording medium as claimed in claim 1, wherein the ferromagnetic particles have an acicular ratio of ferromagnetic iron oxide and chromium dioxide of about 2/1 to about 20/1 and the particles have an average length of 0.2 to 2.0 mu and further wherein the ferromagnetic alloy fine particles have a metal content of not less than 75 wt % wherein not less than 80 wt % of the metal content is a ferromagnetic metal, the particles having a longer diameter of not more than about 1.0 m$\mu$.

10. A magnetic recording medium as claimed in claim 1, wherein the vinyl chloride-vinyl acetate type copolymer has a breaking strength of more than about 5 kg/mm$^2$.

11. A magnetic recording medium as claimed in claim 10, wherein the copolymer has an average molecular weight of more than about 15,000.

12. A magnetic recording medium as claimed in claim 1, wherein said compound is a cross-linking agent.

13. A magnetic recording medium as claimed in claim 9, wherein the ferromagnetic particles have an acicular ratio of ferromagnetic iron oxide and chromium dioxide of not less than 5/1.

14. A magnetic recording medium as claimed in claim 1, wherein the compound is present in an amount in the range of 80 to 250 parts by weight based on 100 parts by weight of the mixture of the copolymer and the urethane resin.

* * * * *